(12) United States Patent
Newton

(10) Patent No.: US 6,644,639 B1
(45) Date of Patent: Nov. 11, 2003

(54) CUTTING BOARD

(76) Inventor: Edward R. Newton, 276 N. Melanie Ct., Palatine, IL (US) 60067

(*) Notice: Subject to any disclaimer, the term of this patent is extended or adjusted under 35 U.S.C. 154(b) by 0 days.

(21) Appl. No.: 10/340,886

(22) Filed: Jan. 13, 2003

(51) Int. Cl.[7] ................................................. B23Q 3/00
(52) U.S. Cl. .................. 269/289 R; 269/13; 269/302.1; 7/170; 7/110
(58) Field of Search ............................. 269/289 R, 13, 269/302.1; 7/170, 110

(56) References Cited

U.S. PATENT DOCUMENTS

| | | | | |
|---|---|---|---|---|
| 1,743,763 A | * | 1/1930 | Erickson | 269/13 |
| 2,609,024 A | * | 9/1952 | Russ | 269/15 |
| 3,371,694 A | * | 3/1968 | Miller | 269/289 R |
| 3,598,164 A | * | 8/1971 | August | 269/13 |
| 4,840,361 A | * | 6/1989 | Richter | 269/289 R |
| 5,938,185 A | | 8/1999 | Kletter | |
| 6,371,470 B1 | | 4/2002 | Ward | |
| 6,386,531 B1 | | 5/2002 | Prosser | |
| 6,478,293 B1 | | 11/2002 | Keener | |

* cited by examiner

*Primary Examiner*—George Nguyen
*Assistant Examiner*—Daniel G. Shanley
(74) *Attorney, Agent, or Firm*—Harrison & Egbert

(57) ABSTRACT

A cutting board having a planar upper surface, a generally flat bottom surface, a peripheral wall extending upwardly adjacent to the side edges and the back edges of the upper surface, and peripheral trough formed between the side edges and the peripheral wall. The upper surface is inclined at approximately 2° from the front edge to the rear right back edge. A canal is formed between the second side edge of the upper surface and the second side wall. This canal is tapered so as to widen toward the back edge. The canal contains a corner well to collect juices from the trough sections and canal.

17 Claims, 2 Drawing Sheets

US 6,644,639 B1

CUTTING BOARD

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to cutting and carving boards. More particularly, the present invention relates to such cutting boards having grooves formed therein for receipt of juices from meat and other food products that are cut or sliced on the cutting board.

BACKGROUND OF THE INVENTION

Whenever food items are cut or sliced using a cutting board or chopping block, juices generated from the foods flow from the cutting board to the surrounding area, such as a kitchen counter. This can create a sloppy and hazardous environment. Also, many times it is desirable to collect and use these juices, especially meat juices, as ingredients in other dishes or as a gravy to garnish the meat.

U.S. Pat. No. 5,938,185, issued on Aug. 17, 1999 to H. Kletter, describes one type of such cutting board appliance. This cutting board assembly includes a base component having a substantially rectangular cutting surface with two opposing side walls depending therefrom. The area between the cutting surface and the side walls defines an interior chamber. The cutting surface has a plurality of apertures aligned in substantially parallel rows which are received within longitudinal channels having downwardly converging said walls for directing juices produced from cut food items into the apertures. A hollow cylindrical conduit is in fluid communication with the apertures and the interior chamber. A drawer-type collection tray is slidably received within the interior chamber of the base component and can be easily removed therefrom for receiving juices from the conduits. The base component also has a pair of substantially C-shaped support members each attached to an opposing side wall for elevating the cutting, surface for a predetermined distance from a table or kitchen counter.

U.S. Pat. No. 6,386,531, issued on May 14, 2002 to M. J. Prosser, describes a cutting board having medial and peripheral drain holes to remove the juices, drippings and food trimings produced during the preparation of foods. A trough traverses the periphery of the cutting board to insure complete drainage of the fluids from the cutting surface.

U.S. Pat. No. 6,371,470, issued on Apr. 16, 2002 to R. S. Ward, teaches a cutting board with a funnel. The cutting board includes a cutting surface with side rails and an aperture. A funnel extends through the aperture. The funnel assembly can be provided with various accessories, such as a strainer and different grater inserts.

U.S. Pat. No. 6,478,293 issued on Nov. 12, 2002 to K. L. Keener, describes an integrally formed polymeric cutting board. This cutting board includes a horizontal cutting surface and an integral trough portion. A first arcuate vertical side wall has an arcuate upper lip portion extending above the cutting surface and extending into the trough portion. An opposed vertical arcuate side wall has an upper edge co-planar with the cutting surface and forms a truncated ellipsoid. The cutting surface is supported by a central support member in the form of a tube having an upper end integral with the horizontal panel. The outer end wall oft he trough portion is inclined outwardly.

It is an object of the present invention to provide a cutting board which has a trough for the collection of juices from the carved or cut item.

It is another object of the present invention to provide a cutting board with a surface suitable for cutting various food items.

It is another object of the present invention to provide a cutting board which avoids the unwanted distribution of food juices and particles.

It is still a further object of the present invention to provide a cutting board which allows juices to be easily removed therefrom.

It is still a further object of the present invention to provide a cutting board which is easy to use, relatively inexpensive, and easy to manufacture.

These and other objects and advantages of the present invention will become apparent from a reading of the attached specification and appended claims.

BRIEF SUMMARY OF THE INVENTION

The present invention is a cutting board having a planar upper surface with a front edge and a back edge, a first side edge, a second side edge, a generally flat bottom surface, and a peripheral wall extending adjacent to the first and second side edges of the upper surface and the back edge of the upper surface. The upper surface is inclined at approximately 2° from the front edge toward the back edge with respect to the plane of the bottom surface. The upper surface may also be inclined from the front edge toward the rear right back edge. A peripheral trough is formed between the side edges and the back edges with respect to the peripheral wall.

In the present invention, the peripheral trough comprises a first trough section which is formed between the first side wall and the first side edge. This first trough is tapered so as to narrow in width from the back edge toward the front edge. The peripheral trough also includes a canal formed between the second side edge and the second side wall. This canal is tapered so as to widen from the front edge toward the back edge. The canal has a bottom surface tapered downwardly from the front edge at approximately 1° angle with respect to the horizontal. The canal forms a well for storage of juices, which can accommodate a spoon for removing juice.

In the present invention, the upper surface and the bottom surface and the peripheral wall are integrally formed together of a material selected from the group consisting of polymer, wood and metal.

DETAILED DESCRIPTION OF THE INVENTION

Figure 1:
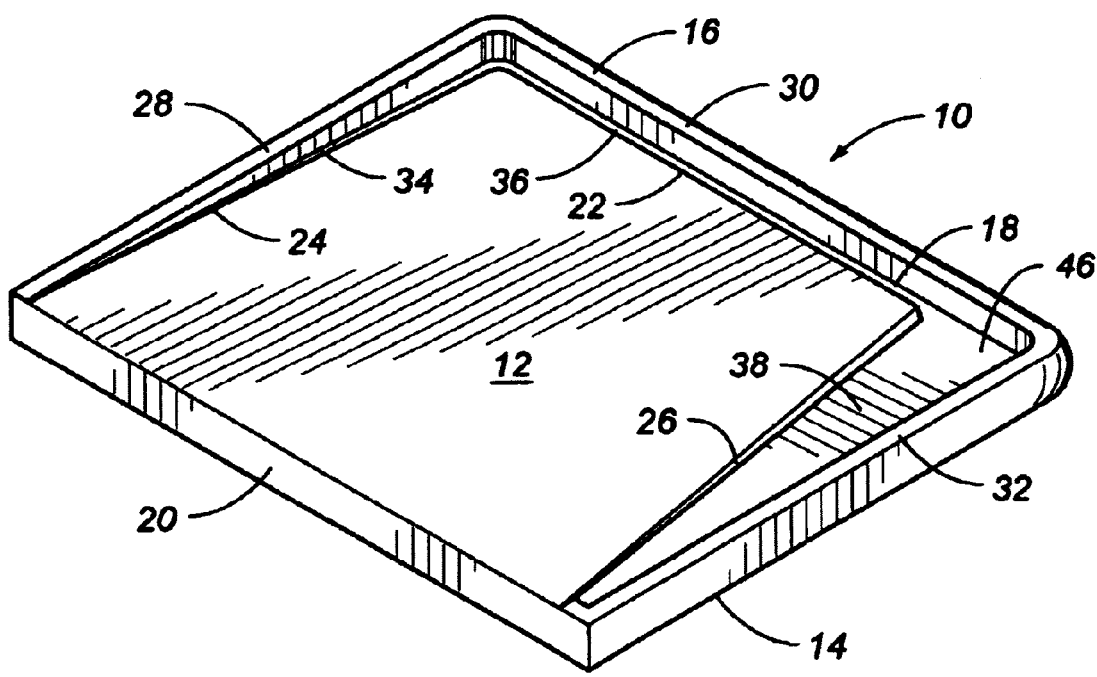
FIG. 1 is a perspective view of the cutting board in accordance with the teaching of the preferred embodiment of the present invention.

Referring to FIG. 1, there is shown the cutting board 10 in accordance with the teachings of the preferred embodiment of the present invention. The cutting board 10 includes a planar upper surface 12, a generally flat bottom surface 14, a peripheral wall 16 and a peripheral trough 18.

The planar upper surface 12 has a front edge 20, a back edge 22, a first side edge 24 and second side edge 26. The upper surface 12 is inclined at approximately 2° from the front edge 20 toward the right rear back edge 22 with respect to the horizontal or with respect to the plane of the flat bottom surface 14. The peripheral wall 16 extends upwardly adjacent to the first side edge 24, and the adjacent to the second side edge 26 and adjacent to the back edge 22 of the upper surface 12. The peripheral wall 16 is designed so as to prevent splattered juices and other materials from leaving the interior area of the cutting board 10 and to retain the juices on the area of the cutting board.

The peripheral trough 18 is formed between the first side edge 24 and the peripheral wall 16. The peripheral trough 18 is also formed between the back edge 22 and the peripheral wall 16. The trough 18 is also formed between the second side edge 26 and the peripheral wall 16. The peripheral wall 16 includes a first side section 28, a back section 30 and a second side section 32. The peripheral wall 16 is slightly elevated above the upper surface 12 so as to provide a barrier to the distribution of food products and juices beyond the perimeter of the cutting board 10.

The peripheral trough 18 has a first trough section 34 formed between the first side edge 24 of the upper surface 12 and the side wall 28. As can be seen in FIG. 1, the first trough section 34 is tapered so as to narrow in width from the back edge 22 and the front edge 20. The trough section 34 can collect juices that may migrate off of the top surface 12 toward the side wall 28. A second trough section 36 is formed between the back edge 22 of the upper surface 12 and the back wall 30. Second trough section 36 communicates with the first trough section 34 in the area of the corner between the back wall 30 and the first side wall 28. The third trough section 38 is designed to collect juices that would migrate, because of the downward taper of the upper surface 12, toward the back wall 30. A canal 38 is shown as formed between the second side edge 26 of the upper surface 12 and the side wall 32. The canal 38 is tapered so as to widen from the front edge 20 the back edge 22. The canal 38 will communicate with the second trough section 36 in the area of the corner well 46 formed between the side wall 32 and the back wall 30. As will be described hereinafter, the canal 38 has a bottom surface which will be tapered downwardly from the front edge 20 at an approximately 1° angle with respect to the plane of the horizontal or with respect to the bottom surface 14. The canal 38 collects juices into the corner well 46, along with the first and second trough sections. The corner well 46 has sufficient depth and width so as to allow the user of the cutting board 10 to easily drain juices that may accumulate by spoon. Since the canal 38 is tapered downwardly, juices accumulated throughout the trough sections 34 and 36 will ultimately accumulate in the corner well 46. The tapering of the second side edge 26, in the manner illustrated in FIG. 1, will help to funnel the juices accumulating in canal 38 for storage in corner well 46.

The cutting board 10 of the present invention has its components of the upper surface 12, the bottom surface 14, the peripheral wall 16 and the peripheral trough 18 all integrally formed together. The cutting board 10 is formed from a material of either polymer plastic, wood or metal. Additionally, specialty material, such as CORIAN (™), can also be used. The board can be manufactured in a variety of sizes depending on the requirements for use.

Figure 2:
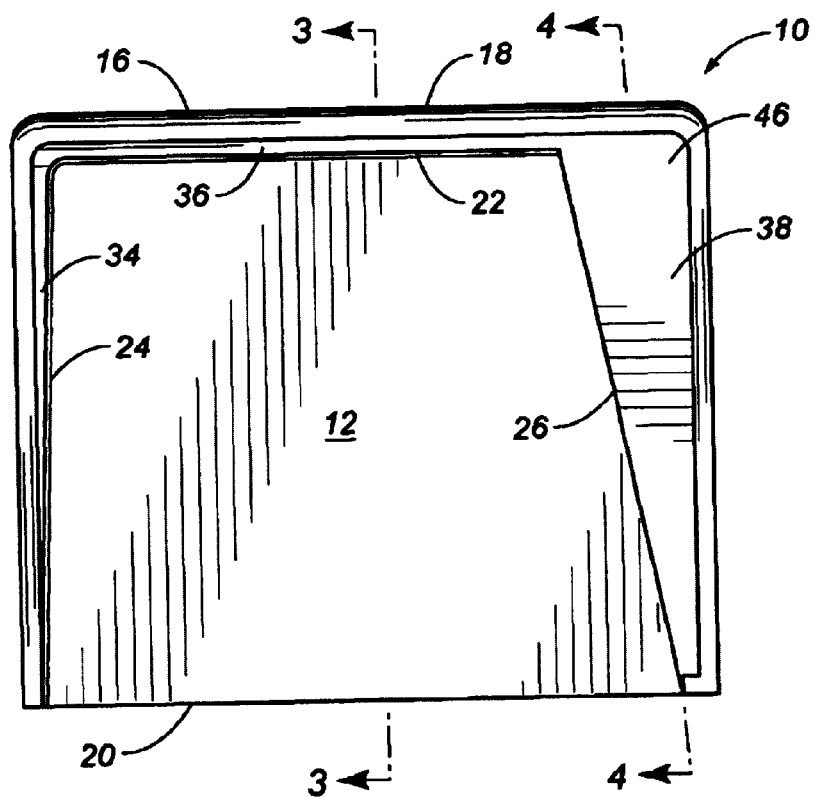
FIG. 2 is a plan view of the cutting board in accordance with the teaching of the present invention.

FIG. 2 shows a plan view of the cutting board 10 of the present invention. In FIG. 2 it can be seen that the upper surface 12 includes the forward edge 20, the back edge 22, the first side edge 24 and the second side edge 26. The peripheral trough 18 is formed between the respective edges of the upper surface 12 and the peripheral wall 16. As can be seen in FIG. 2, the canal 38 occupies a larger area than the area occupied by the trough sections 34 or 36. The canal 38, in one form of the present invention, will have a width at the back edge 22 of approximately 3". The width of the canal 32 in the area of the front edge 20 will be approximately ½". The canal 38 will collect juice at corner well 46 to allow juices to be removed therefrom.

Figure 3:
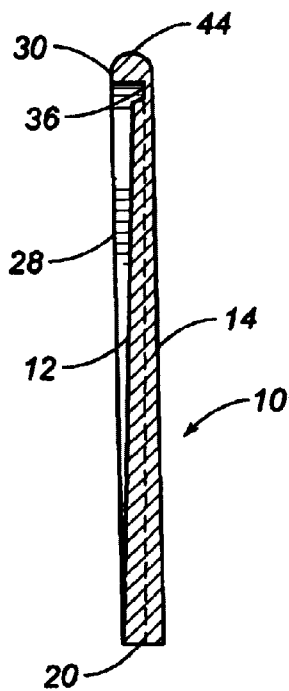
FIG. 3 is a cross-sectional view taken across lines 3—3 of FIG. 2 of the cutting board of the present invention.

FIG. 3 shows the cross-sectional view of the cutting board 10 of the present invention. In particular, FIG. 3 shows the configuration of the back wall 30, the bottom 14, the front edge 20 and the planar upper surface 12. Side wall 28 is also illustrated in FIG. 3. Most importantly, in FIG. 3, the upper surface 12 has a 2° taper with respect to the plane of the bottom surface 14 or with respect to a horizontal plane towards the right rear back edge. The second trough section 36 will be formed adjacent to the inner surface of the wall 30. The wall 30 has a generally curved outer edge 44. The front edge 20 is a generally flat edge which is the thickness of the cutting board 10. The wall 28 will have a similar height as the front edge 20 and will extend across the side 24 toward the back wall 30.

Figure 4:
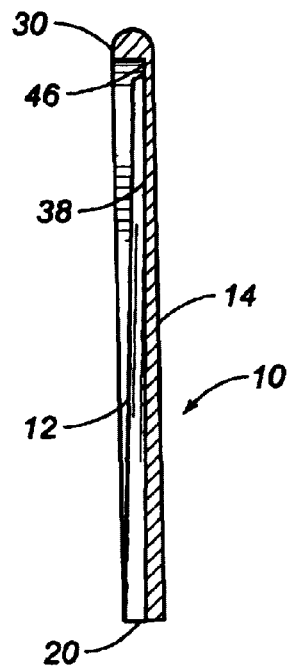
FIG. 4 is a cross-sectional view taken across lines 4—4 of FIG. 2 of the cutting board of the present invention.

FIG. 4 shows the cross-sectional view of the canal 38 formed in the present invention. Canal 38 is illustrated as having a very slightly tapered surface 50. Tapered surface 50 tapers at an approximately 1° angle with respect to the bottom surface 14 so as to allow for juices within canal 38 to migrate slowly toward the back edge 24 of the cutting board 10. Juices are collected from trough sections and the canal 38 by the corner well 46.

The present invention offers a unique arrangement for the carving and cutting of meats, and other products, on the cutting board. The canal 38 allows for the collection of the juices from the meat in an easy and convenient manner. The configuration of the troughs allows the collections of such juices to migrate into a desired area on the cutting board. Since the cutting board is of a unitary configuration, it can be easily formed of polymeric material by injection molding. As such, it has a relatively inexpensive configuration. The peripheral wall 16 of the cutting board assures that the juices emitted from the meat will be retained within the area of the cutting board. As can be seen, the cutting board has a relatively flat profile so that it can be easily stored in either a horizontal or vertical orientation.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A cutting board comprising:
   a planar upper surface having a front edge and a back edge and a first side edge and a second side edge and a generally flat bottom surface, said upper surface inclined at approximately 2 degrees from said front edge to said back edge with respect to said bottom surface;

a peripheral wall extending upwardly adjacent to said first side edge and said back edge and said second side edge of said upper surface; and a peripheral trough formed adjacent said peripheral wall at said first side edge and formed adjacent said peripheral wall at said back edge and formed adjacent said peripheral wall at said second side edge.

2. The cutting board of claim 1, said peripheral trough comprising:

a first trough section formed adjacent said first side wall and said first side edge, said first trough section tapered so as to narrow in width from said back edge towards said first edge of said upper surface.

3. The cutting board of claim 1, said peripheral trough comprising:

a canal formed between said second side edge and second side wall.

4. The cutting board of claim 3, said canal being tapered so as to widen from said front edge toward said back edge of said upper surface.

5. The cutting board of claim 4, said canal having a bottom surface tapered downwardly toward said front edge at an approximately one degree angle with respect to said flat bottom surface.

6. The cutting board of claim 3, said canal having a corner well thereto at said rear right back edge of said upper section.

7. The cutting board of claim 1, said upper surface and said bottom surface and said peripheral wall being integrally formed together of a material selected from the group consisting of polymer, wood and metal.

8. A cutting board comprising:

an upper surface having a front edge and a back edge and a first side edge and second side edge;

a peripheral wall extending upwardly adjacent to said first side edge and to said back edge and to said second side edge of said upper surface;

a peripheral trough formed adjacent said peripheral wall at said first side edge and formed adjacent said peripheral wall adjacent said back edge and formed adjacent said peripheral wall at said second side edge; and a first trough section formed adjacent said first side wall and said first side edge, said first trough section tapered so as to narrow in width from said back edge towards said front edge of said upper surface.

9. The cutting board of claim 8, said peripheral trough comprising:

a canal formed between said second side edge and said second side wall.

10. The cutting board of claim 9, said canal being tapered so as to widen from said front edge toward said back edge of said upper surface.

11. The cutting board of claim 10, said canal having a bottom surface tapered downwardly towards said back edge at an approximately one degree angle.

12. The cutting board of claim 9, said canal having a corner well thereto at said rear right back edge of said upper section.

13. The cutting board of claim 8, further comprising:

a generally flat bottom surface, said upper surface being inclined at approximately five degrees from said front edge towards said back edge with respect to said flat bottom surface.

14. A cutting board comprising:

a planar upper surface having a front edge and a back edge and a first side edge and a second side edge;

a peripheral wall extending upwardly adjacent to first side edge and said back edge and said second side edge of said upper surface; and a canal formed between said second side edge and said second side wall, said canal being tapered so as to widen from said front edge toward said back edge.

15. The cutting board of claim 14, said canal having a bottom surface tapered downwardly toward said back edge at an angle of approximately one degree with respect to horizontal.

16. The cutting board of claim 14, said canal having a corner well at said back edge of said upper surface.

17. The cutting board of claim 14, further comprising:

a first trough section formed between said first side wall and said first side edge;

a second trough section formed between said back edge and said peripheral wall, said second trough section communicating with said first trough section, said second trough section communicating with said canal.

* * * * *